United States Patent
Masuda et al.

(10) Patent No.: US 12,069,226 B2
(45) Date of Patent: Aug. 20, 2024

(54) IMAGING DEVICE

(71) Applicant: HITACHI ASTEMO, LTD., Hitachinaka (JP)

(72) Inventors: Keisuke Masuda, Hitachinaka (JP); Hidenori Shinohara, Hitachinaka (JP); Kenichi Takeuchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 114 days.

(21) Appl. No.: 17/792,087

(22) PCT Filed: Dec. 25, 2020

(86) PCT No.: PCT/JP2020/048703
§ 371 (c)(1),
(2) Date: Jul. 11, 2022

(87) PCT Pub. No.: WO2021/176821
PCT Pub. Date: Sep. 10, 2021

(65) Prior Publication Data
US 2023/0048226 A1 Feb. 16, 2023

(30) Foreign Application Priority Data
Mar. 5, 2020 (JP) .................................. 2020-038230

(51) Int. Cl.
*H04N 13/204* (2018.01)
*G03B 37/04* (2021.01)
(Continued)

(52) U.S. Cl.
CPC ........... *H04N 13/204* (2018.05); *H04N 23/55* (2023.01); *H04N 23/90* (2023.01); *G03B 37/04* (2013.01)

(58) Field of Classification Search
CPC ....... H04N 13/204; H04N 23/90; H04N 23/55
See application file for complete search history.

(56) References Cited

U.S. PATENT DOCUMENTS 6,811,330 B1 * 11/2004 Tozawa ................... B60R 11/04
                                                        296/203.02
2016/0006911 A1 * 1/2016 Kimura ................... H04N 23/54
                                                        348/47
(Continued)

FOREIGN PATENT DOCUMENTS

| JP | 2008-040115 A | 2/2008 |
| JP | 2014-238558 A | 12/2014 |
| JP | 2019-032409 A | 2/2019 |

OTHER PUBLICATIONS

International Search Report with English Translation and Written Opinion in International Application PCT/JP2020/048703 mailed Apr. 13, 2021.

*Primary Examiner* — Rowina J Cattungal
(74) *Attorney, Agent, or Firm* — Foley & Lardner LLP

(57) ABSTRACT

Provided is an imaging device capable of reliably achieving both widening an angle of view and an improvement in productivity. An imaging device 100 includes a pair of camera modules 2 each including an imaging element 4 and a lens unit 3, in which optical axes OA of the lens units 3 are arranged in parallel to each other. Each of the pair of camera modules 2 has a configuration in which the imaging element 4 and the lens unit 3 are relatively arranged such that a center C of the imaging element 4 is separated from the optical axis OA by the same distance in the same direction. With respect to the posture of one camera module 2, the other camera modules 2 is arranged in an inverted posture in which the other camera modules 2 has rotated around a rotation axis RA along the optical axis OA. To read directions Dh, Dv in which signals are read from the imaging element 4 and that have been set in advance in one camera module 2, read directions Dh, Dv, in which signals are read from the imaging element 4 of the other camera module 2, are set to be opposite.

3 Claims, 11 Drawing Sheets

(51) Int. Cl.
*H04N 23/55* (2023.01)
*H04N 23/90* (2023.01)

(56) References Cited

U.S. PATENT DOCUMENTS

| | | | |
|---|---|---|---|
| 2018/0054552 A1* | 2/2018 | Komori | H04N 25/60 |
| 2020/0213498 A1* | 7/2020 | Broers | H04N 23/90 |
| 2020/0213574 A1 | 7/2020 | Yamazaki et al. | |
| 2020/0366883 A1* | 11/2020 | Matsuura | G06T 7/593 |

* cited by examiner

IMAGING DEVICE

TECHNICAL FIELD

The present invention relates to an imaging device.

BACKGROUND ART

Development competition is intensifying with the spread of sensors to be mounted on vehicles, and there is an increasing demand for recognition functions for safe driving and automatic driving. As one of them, there is widening an angle of view in which a subject can be recognized at a wide angle with respect to a vehicle (e.g., PTL 1).

PTL 1 describes an imaging device including a pair of cameras each having an optical lens and an imaging element, the cameras being separated from each other by a predetermined interval, in which a center of the imaging element is offset in a predetermined interval direction with respect to an optical axis of the optical lens so as to increase a field of view, and among images captured by the respective cameras, a corresponding point confirmed in an image captured by one of the cameras is set as a reference point for starting a search for a corresponding point in an image captured by the other of the cameras.

CITATION LIST

Patent Literature

PTL 1: JP 2014-238558 A

SUMMARY OF INVENTION

Technical Problem

In the imaging device described in PTL 1, the center of each imaging element is offset along a predetermined interval direction in order to achieve widening an angle of view by expanding a stereo vision area, or an area where imaging areas of the respective cameras overlap. In this case, the directions in which the centers of the respective imaging elements are offset are opposite to each other, so that in the imaging device described in PTL 1, it is necessary to provide constituting elements of each camera, such as an imaging element substrate, as components dedicated to each camera. In the imaging device described in PTL 1, there is a risk that the cost of equipment and management for manufacturing the imaging device may increase, or components may be erroneously attached to the right camera and the left camera, thereby decreasing productivity. Therefore, in the imaging device described in PTL 1, it is difficult to achieve both widening the angle of view of the stereo vision area and an improvement in productivity.

The present invention has been made in view of the above, and an object of the present invention is to provide an imaging device capable of reliably achieving both widening an angle of view and an improvement in productivity.

Solution to Problem

In order to solve the above problem, an imaging device according to the present invention is an imaging device including a pair of camera modules each including an imaging element and a lens unit, optical axes of the lens units of the pair of camera modules being arranged in parallel to each other, in which: each of the pair of camera modules has a configuration in which the imaging element and the lens unit are relatively arranged such that a center of the imaging element is separated from the optical axis by the same distance in the same direction; with respect to a posture of one of the camera modules, the other of the camera modules is arranged in an inverted posture in which the other of the camera modules has rotated around a rotation axis along the optical axis; and to a read direction in which a signal from the imaging element is read and that has been set in advance in one of the camera modules, a read direction, in which a signal from the imaging element of the other of the camera modules is read, is set to be opposite.

Advantageous Effects of Invention

According to the present invention, both widening an angle of view and an improvement in productivity can be reliably achieved.

Problems, configurations, and advantageous effects other than those described above will be clarified by the following description of embodiments.

DESCRIPTION OF EMBODIMENTS

Hereinafter, embodiments of the present invention will be described with reference to the drawings. Note that configurations denoted by the same reference signs in the respective embodiments have similar functions in the respective embodiments unless otherwise specified, and thus the description thereof will be omitted. In addition, orthogonal coordinate axes are illustrated in a necessary view in order to clarify the explanation of the positions of the respective parts.

In the present embodiment, a direction, in which an optical axis GA of a lens unit 3 provided in an imaging device 100 extends, is also referred to as a "front-rear direction". The "front side" is a direction from the lens unit 3 toward a subject. The "front side" corresponds to the forward direction of a vehicle in a state where the imaging device 100 is installed in the vehicle. The "rear side" is an opposite direction to the front side. The "rear side" corresponds to the backward direction of a vehicle in a state where the imaging device 100 is installed in the vehicle.

In the present embodiment, a direction, in which a base line BL connecting a pair of camera modules 2 provided in the imaging device 100 extends, is also referred to as a "left-right direction". The "left side" is a direction toward the left when the imaging device 100 is viewed from the rear side to the front side. The "left side" corresponds to a direction toward the left when a vehicle is viewed from the rear side to the front side in a state where the imaging device 100 is installed in the vehicle. The "right side" is an opposite direction to the left side. The "right side" corresponds to a direction toward the right when a vehicle is viewed from the rear side to the front side in a state where the imaging device 100 is installed in the vehicle.

In the present embodiment, a direction, extending vertically when the imaging device 100 is viewed from the rear side to the front side, is also referred to as an "up-down direction". The "up side" is a direction toward the upside when the imaging device 100 is viewed from the rear side to the front side. The "up side" corresponds to an opposite direction to the direction of gravity in a state where the imaging device 100 is installed in a vehicle. The "down side" is an opposite direction to the up side. The "down side" corresponds to the direction of gravity in a state where the imaging device 100 is installed in a vehicle.

Figure 1:
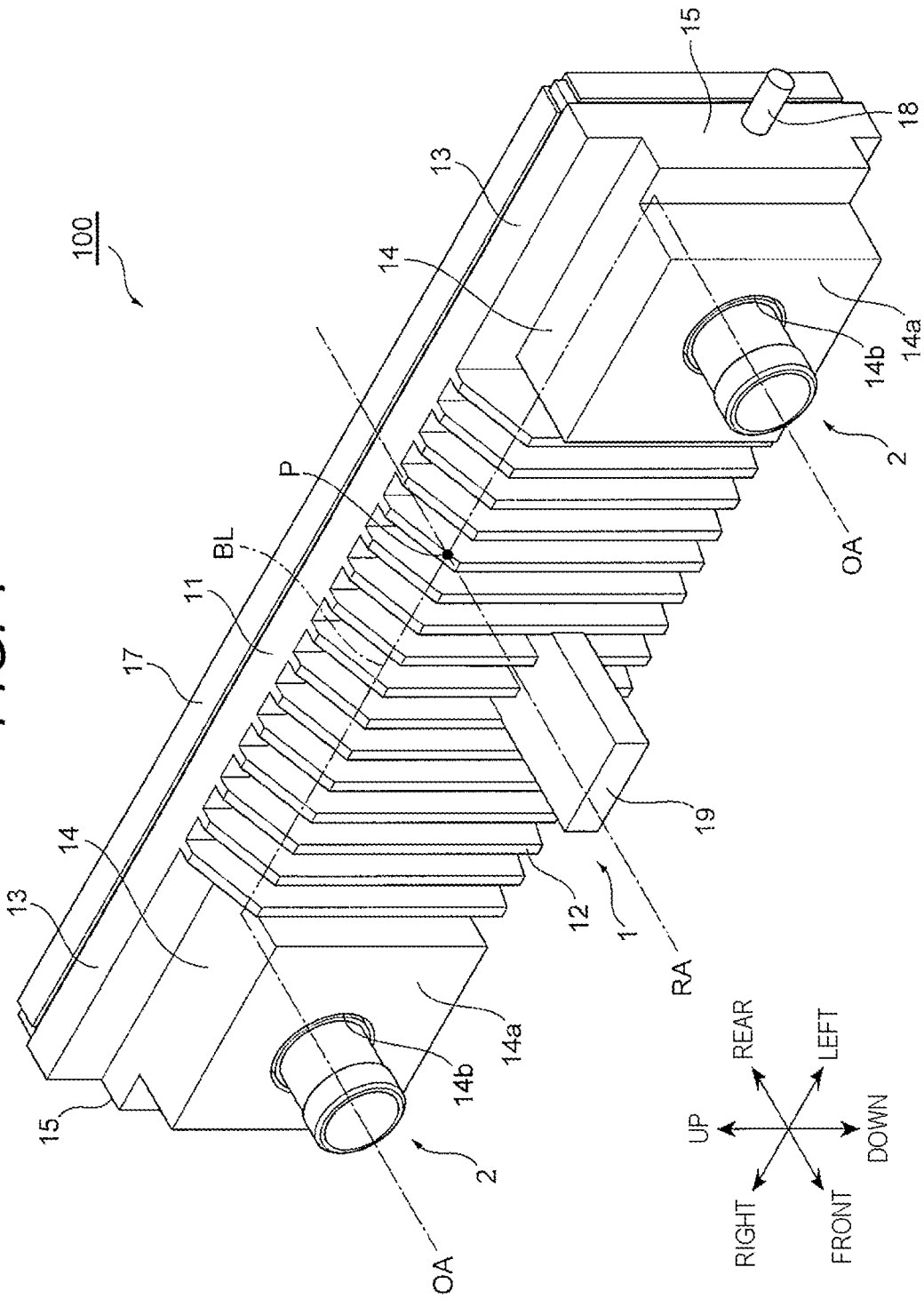
FIG. 1 is a view illustrating an appearance of an imaging device.
Figure 2:
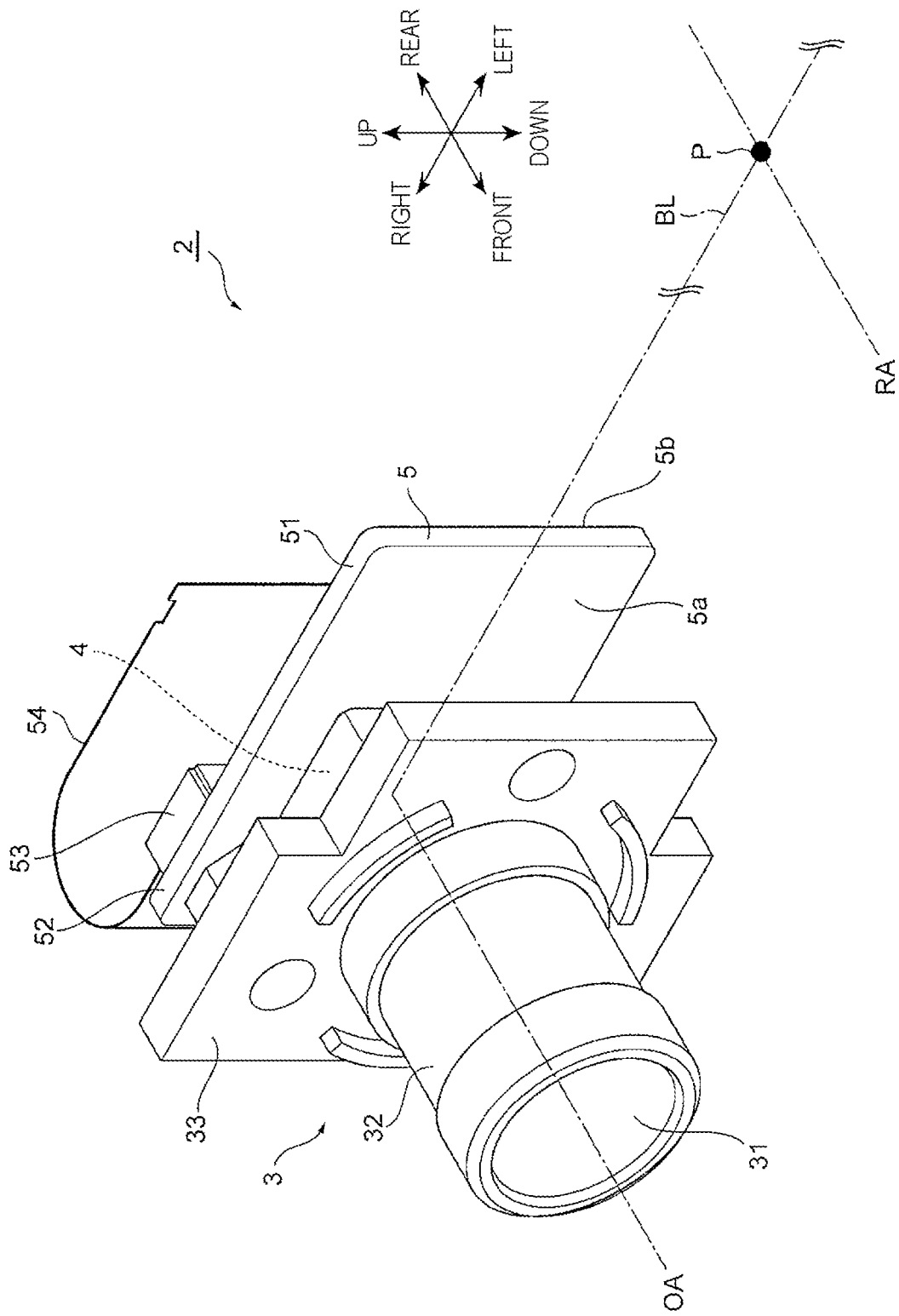
FIG. 2 is a view illustrating an appearance of a camera module illustrated in FIG. 1.
Figure 3:
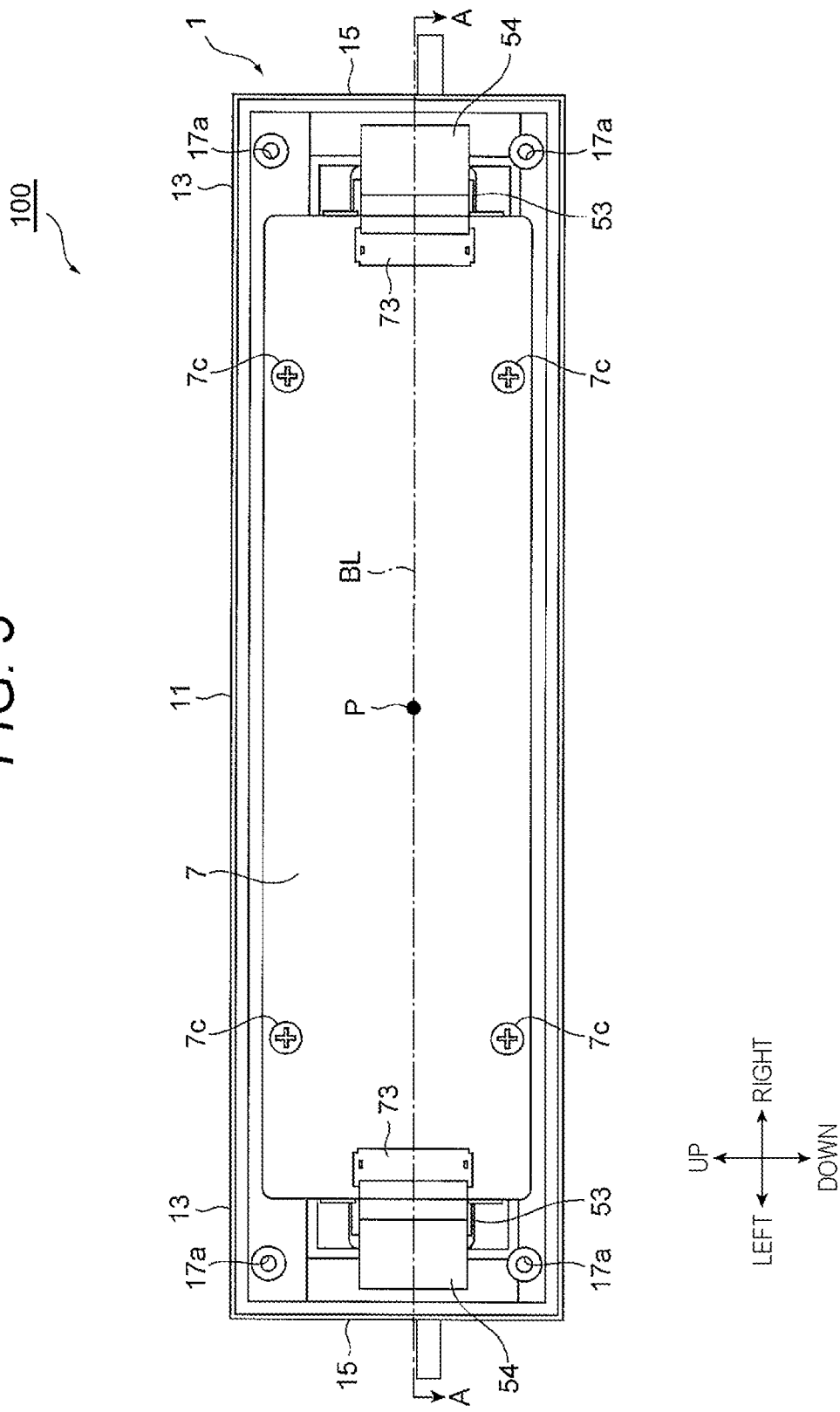
FIG. 3 is a view of the imaging device illustrated in FIG. 1 as viewed from the rear side.
Figure 4:
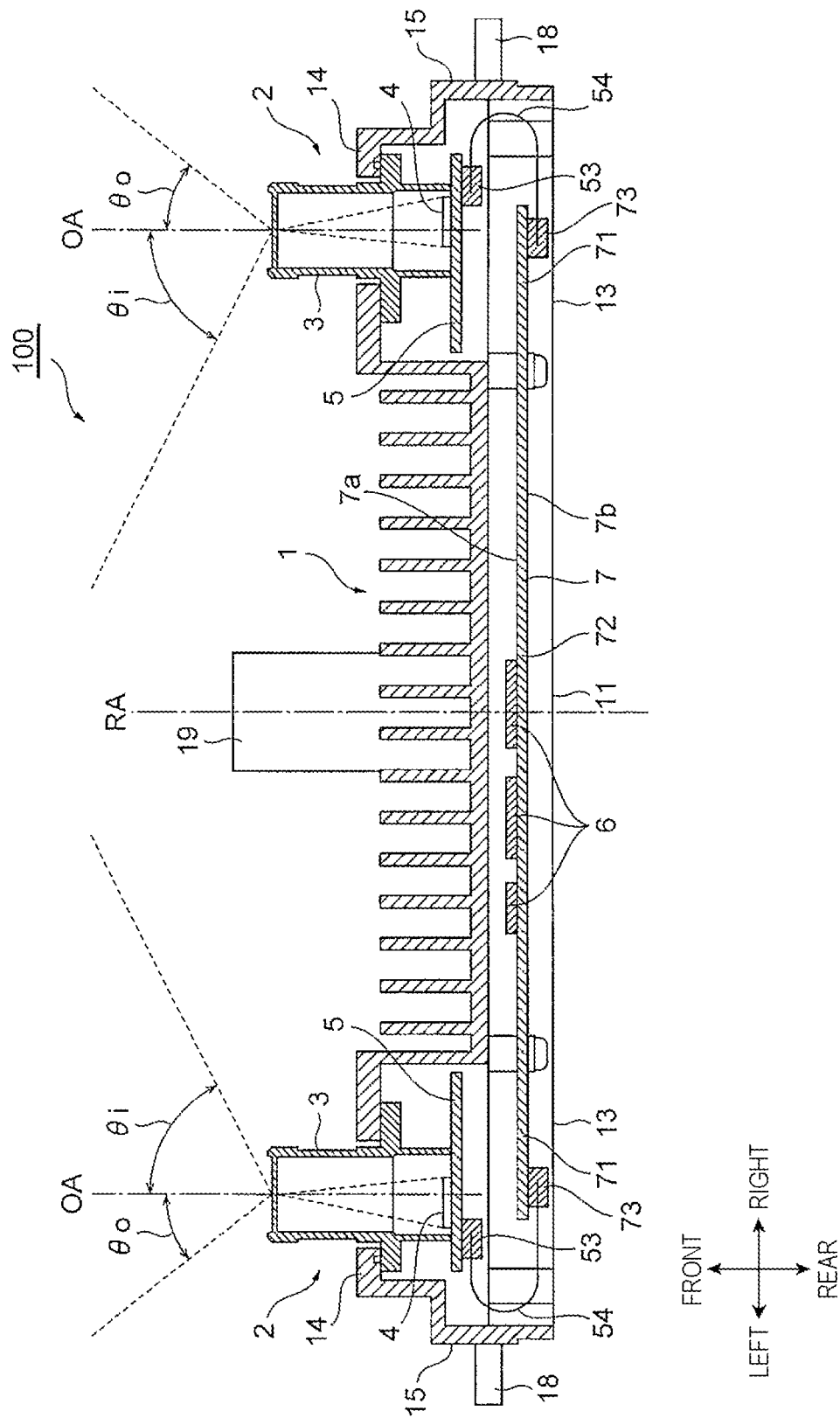
FIG. 4 is a cross-sectional view of the imaging device, taken along line A-A illustrated in FIG. 3.
Figure 5:
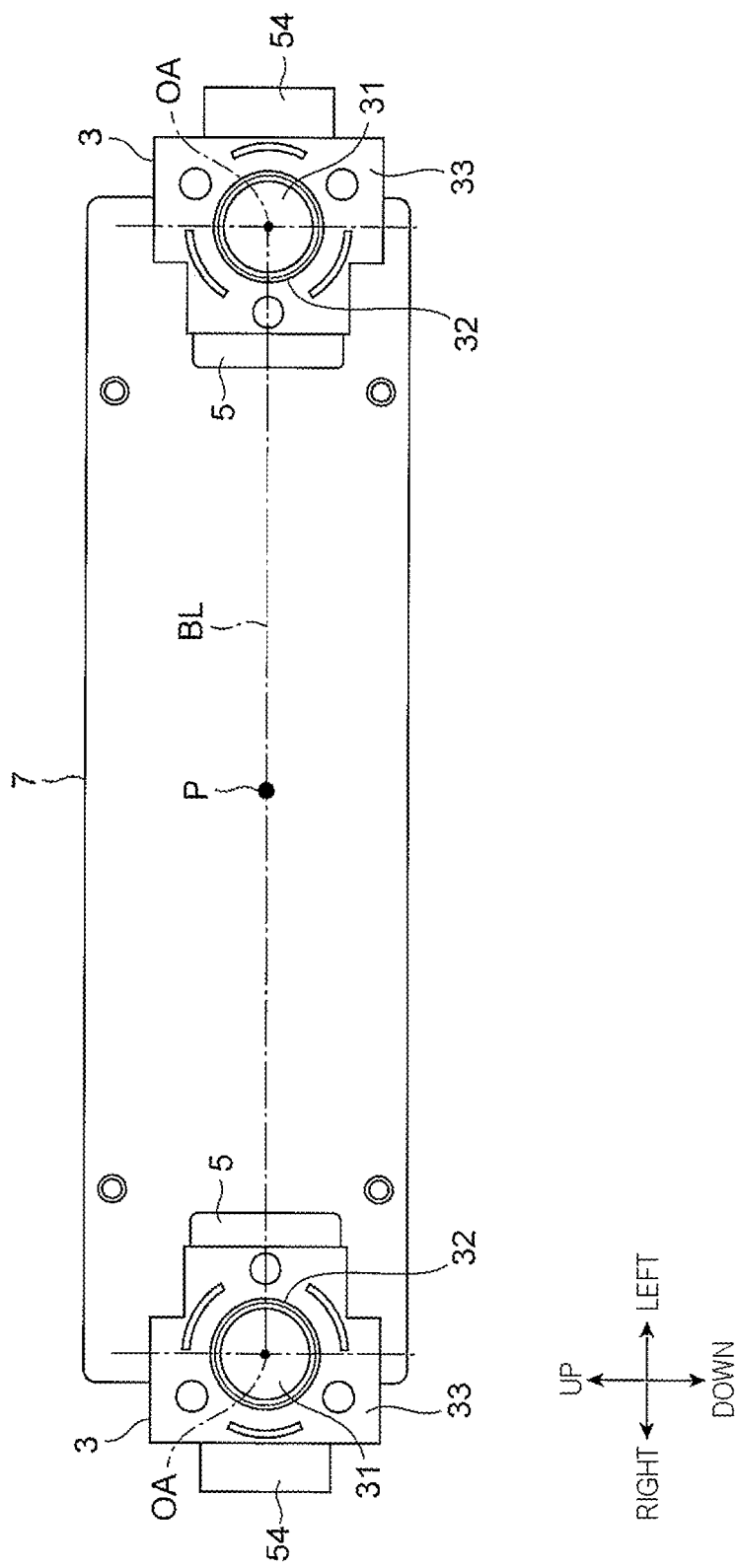
FIG. 5 is a view of the imaging device illustrated in FIG. 1 as viewed from the front side.
Figure 6:
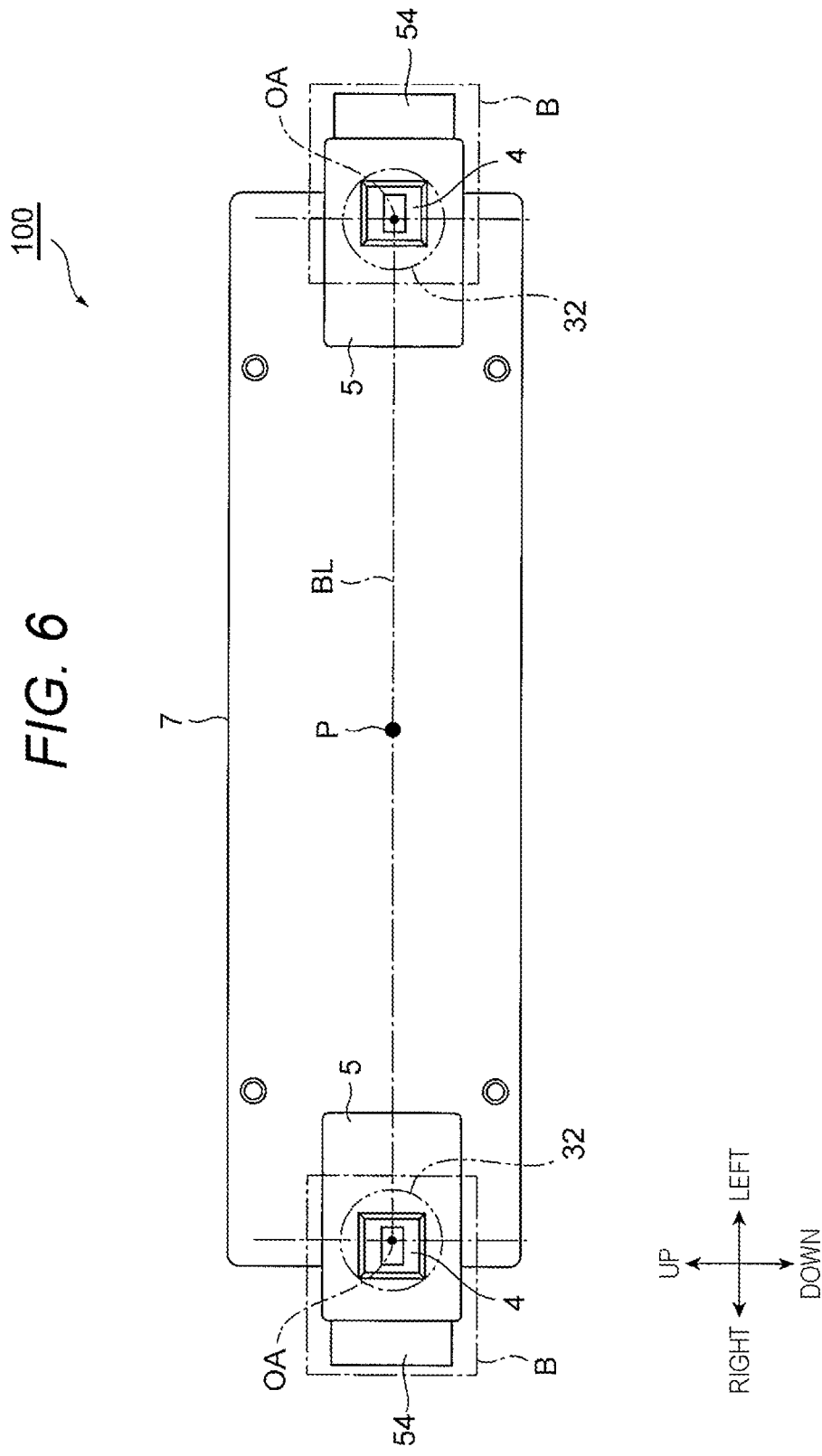
FIG. 6 is a view in which the illustration of a lens unit is omitted from the imaging device illustrated in FIG. 5.

FIG. 1 is a view illustrating an appearance of the imaging device 100. FIG. 2 is a view illustrating an appearance of the camera module 2 illustrated in FIG. 1. FIG. 3 is a view of the imaging device 100 illustrated in FIG. 1 as viewed from the rear side, in which the illustration of a cover 17 is omitted. FIG. 4 is a cross-sectional view of the imaging device 100, taken along line A-A illustrated in FIG. 3. FIG. 5 is a view of the imaging device 100 illustrated in FIG. 1 as viewed from the front side, in which the illustration of a housing 1, a circuit element 6, and the cover 17 is omitted. FIG. 6 is a view in which the illustration of the lens unit 3 is omitted from the imaging device 100 illustrated in FIG. 5.

The imaging device 100 is, for example, a stereo camera that is installed inside a windshield glass of a vehicle, such as an automobile, toward the front side in a traveling direction in order to image the surroundings of the vehicle. The imaging device 100 can simultaneously image the surroundings of the vehicle by the pair of camera modules 2, obtain a parallax from the acquired pair of images, and measure: a distance to a subject present around the vehicle, such as a road, a preceding vehicle, an oncoming vehicle, a pedestrian, or an obstacle; a relative speed; and the like. Measurement results are transmitted from the imaging device 100 to a controller of the vehicle, and is used for processing the control of traveling, braking, and the like of the vehicle, and for others.

The imaging device 100 includes the housing 1, the pair of camera modules 2 that image a surrounding environment of the vehicle, and a signal processing board 7 on which the circuit element 6 that processes an image signal output from an imaging element 4 is mounted.

The housing 1 houses the pair of camera modules 2 and the signal processing board 7. The housing 1 has a heat dissipation property capable of dissipating heat generated in the pair of camera modules 2 and the signal processing board 7 to the outside, and rigidity capable of suppressing occurrence of positional deviation or application of vibration to the pair of camera modules 2 and the signal processing board 7. As illustrated in FIG. 1, the housing 1 is a metal housing having a box shape elongated in the direction in which the base line BL extends, that is, in the left-right direction, and is manufactured by, for example, aluminum die casting or the like. The housing 1 is covered from the rear side with the cover 17 in a state where the pair of camera modules 2 and the signal processing board 7 are housed. The cover 17 is made of a metal plate such as an aluminum plate.

As illustrated in FIGS. 1, 3, and 4, the housing 1 has an intermediate portion 11 positioned between both end portions 13 in the left-right direction. A heat dissipation fin 12 is provided in the intermediate portion 11. The heat dissipation fin 12 is configured by arranging a plurality of heat dissipation plates, each extending in the up-down direction, so as to be spaced apart from each other along the left-right direction.

As illustrated in FIGS. 1 and 4, a pair of attachment portions 14, to which the pair of camera modules 2 are respectively to be attached, are respectively provided at both the end portions 13, in the left-right direction, of the housing 1. Each of the pair of attachment portions 14 has a rectangular box shape and has a front portion 14a facing the front side. The front portion 14a is orthogonal to the direction in which the optical axis OA extends, and is provided with a through hole 14b into which the lens unit 3 of the camera module 2 is to be inserted.

The housing 1 also has fixing portions 18 and 19 for fixing the housing 1 to the vehicle. Each of the fixing portions 18 has a pin shape extending in an outward direction from a side portion 15 that is one of end surfaces in the left-right direction. The outward direction is a direction from a midpoint P of the base line BL toward the optical axis OA. The fixing portion 19 has a plate shape extending from the intermediate portion 11 toward the front side. The housing 1 is fixed to the vehicle by respectively fitting the fixing portions 18 and 19 into members provided inside the windshield glass of the vehicle and pressing the members with spring members or the like.

Each of the pair of camera modules 2 is attached to the attachment portion 14 of the housing 1 in a state where the lens unit 3 facing the front side is inserted into the through hole 14b of the attachment portion 14. The pair of camera modules 2 are attached in a state of being separated from each other in the left-right direction by an interval corresponding to the length of the base line BL connecting the pair of camera modules 2. Each of the pair of camera modules 2 is attached in a state where a rotational deviation around the optical axis OA is adjusted, that is, in a state where the roll angle of a lens 31 is appropriate.

The pair of camera modules 2 have the same structure as each other. Each of the pair of camera modules 2 has a configuration in which the imaging element 4 and the lens unit 3 are relatively arranged such that the center of the imaging element 4 is separated from the optical axis OA by the same distance in the same direction. Then, with respect to the posture of one camera module 2, the other camera module 2 is arranged in an inverted posture in which the other camera module 2 has rotated around a rotation axis RA along the optical axis OA. The rotation axis RA is a rotation axis along the optical axis OA. It may be the same axis as the optical axis OA, or may be an axis that is parallel to the optical axis OA and arranged at a position separated from the optical axis OA. In the present embodiment, the rotation axis RA is an axis that passes through the midpoint P of the base line BL and is parallel to the optical axis CA, as illustrated in FIGS. 1 and 4. Details will be described later with reference to FIGS. 8 to 10.

As illustrated in FIG. 2, each of the pair of camera modules 2 includes the lens unit 3, or an imaging optical system of the camera module 2, and an imaging element substrate 5 on which the imaging element 4 is mounted. That is, the pair of camera modules 2 include a pair of the lens units 3 and a pair of the imaging element substrates 5 on which a pair of the imaging elements 4 are respectively mounted.

Each of the pair of the lens units 3 has the optical axis OA orthogonal to each of the pair of the imaging elements 4. The pair of camera modules 2 are arranged such that the optical axes of the lens units 3 are parallel to each other. In the pair of the lens units 3, one lens unit 3 and the other lens unit 3 are made of the same material, and with respect to the posture of one lens unit 3, the other lens unit 3 is arranged in an inverted posture in which the other lens unit 3 has rotated around the rotation axis RA.

As illustrated in FIG. 2, each of the pair of the lens units 3 includes the lens 31 that forms a subject image on the light receiving surface of the imaging element 4, a lens barrel 32 that holds the lens 31, and a flange 33 that holds the lens barrel 32 and is connected to the imaging element substrate 5.

In the pair of the imaging elements 4, one imaging element 4 and the other imaging element 4 are made of the same hardware and software, and with respect to the posture of one imaging element 4, the other imaging element 4 is arranged in an inverted posture in which the other imaging element 4 has rotated around the rotation axis RA. In the pair of the imaging elements 4, however, the settings of read directions Dh, Dv in which signals are read are different between the one imaging element 4 and the other imaging element 4. Details will be described later with reference to FIGS. 8 to 10.

Each of the pair of the imaging elements 4 includes an image sensor such as a complementary metal oxide semi-conductor (CMOS) or a charge coupled device (CCD). The imaging element 4 is joined to a front surface 5a of the imaging element substrate 5 using a joining material such as solder. The imaging element 4 is connected to a first connector 53 mounted on a back surface 5b of the imaging element substrate 5 via a wiring pattern of the imaging element substrate 5. The first connector 53 is connected to a second connector 73 mounted on the signal processing board 7 via a flexible wiring member 54 such as a flexible printed circuit (FPC) or a flexible flat cable (FFC), as illustrated in FIG. 4.

In the pair of the imaging element substrates 5, one imaging element substrate 5 and the other imaging element substrate 5 are made of the same material, and with respect to the posture of one imaging element substrate 5, the other imaging element substrate 5 is arranged in an inverted posture in which the other imaging element substrate 5 has rotated around the rotation axis RA.

Each of the pair of the imaging element substrates 5 includes a printed circuit board in which an insulating base material containing a synthetic resin, such as glass epoxy, and a wiring pattern, such as a copper foil, are laminated. As illustrated in FIG. 2, the imaging element substrate 5 has the front surface 5a, or a surface on which the imaging element 4 is to be mounted, and the back surface 5b, or a surface opposite to the front surface 5a in the direction in which the optical axis GA extends. The front surface 5a of the imaging element substrate 5 is a surface on the front side of the imaging element substrate 5, and the back surface 5b of the imaging element substrate 5 is a surface on the rear side of the imaging element substrate 5. The front surface 5a and the back surface 5b of the imaging element substrate 5 are main surfaces each having a large area among the surfaces constituting the imaging element substrate 5, and are surfaces each orthogonal to the optical axis OA. The position of the imaging element substrate 5 is adjusted such that a subject image having passed through the lens 31 is formed on the light receiving surface of the imaging element 4, and the imaging element substrate 5 is bonded to the flange 33 of the lens unit 3.

The imaging element substrate 5 has end portions 51 and 52 in the left-right direction. The end portions 51 and 52 are end portions positioned in an outward direction from the midpoint P of the base line BL toward the optical axis GA. The end portions 51 and 52 include a first end portion 51 close, in the outward direction, to the midpoint P and a second end portion 52 far from the midpoint P. In other words, each of the pair of the imaging element substrates 5 has the first end portion 51, positioned in the outward direction from the midpoint P of the base line BL toward the optical axis GA, and the second end portion 52 positioned, in the outward direction, outside the first end portion 51, when viewed from the direction in which the optical axis OA extends. In each of the pair of the imaging element substrates 5, the first connector 53 to be connected to the signal processing board 7 is mounted on the back surface 5b of the second end portion 52.

As illustrated in FIG. 4, the circuit element 6 includes a plurality of circuit elements 6. Specifically, the circuit element 6 includes an integrated circuit, such as a field programmable gate array (FPGA), that performs image processing and the like on an image indicated by an image signal output from the imaging element 4. Furthermore, the circuit element 6 includes a processor, such as a micro processing unit (MPU), that performs various types of signal processing and arithmetic processing, a memory to be used for temporary storage of data and programs, and the like. The circuit element 6 is joined to a front surface 7a of the signal processing board 7 using a joining material such as solder. The circuit element 6 is connected to the second connector 73 mounted on a back surface 7b of the signal processing board 7 via a wiring pattern of the signal processing board 7. The second connector 73 is connected to the first connector 53 mounted on the imaging element substrate 5 via the wiring member 54.

The signal processing board 7 includes a printed circuit board in which an insulating base material containing a synthetic resin, such as glass epoxy, and a wiring pattern, such as a copper foil, are laminated. As illustrated in FIG. 4, the signal processing board 7 has the front surface 7a, or a surface on which the circuit element 6 is to be mounted, and the back surface 7b, or a surface opposite to the front surface 7a in the direction in which the optical axis OA extends. The front surface 7a of the signal processing board 7 is a surface on the front side of the signal processing board 7, while the back surface 7b of the signal processing board 7 is a surface on the rear side of the signal processing board 7. The front surface 7a and the back surface 7b of the signal processing board 7 are main surfaces each having a large area among the surfaces constituting the signal processing board 7, and are surfaces each orthogonal to the optical axis OA. The signal processing board 7 is arranged with a space, in the rear direction, from the imaging element substrate 5 so as to face the back surface 5b of the imaging element substrate 5.

The signal processing board 7 has both end portions 71 in the left-right direction and an intermediate portion 72 positioned between both the end portions 71. Both the end portions 71 are end portions positioned in the outward direction from the midpoint P of the base line BL toward the optical axis OA. In the signal processing board 7, a pair of the second connectors 73, respectively connected to a pair of the first connectors 53 respectively mounted on the pair of the imaging element substrates 5, are respectively mounted on the back surfaces 7b of both the end portions 71. In the signal processing board 7, the circuit element 6 is mounted on the front surface 7a of the intermediate portion 72.

The signal processing board 7 is attached to the housing 1 by fastening members such as screws. Attachment positions 7c of the signal processing board 7 to the housing 1 are positioned between the pair of the imaging element substrates 5 and the circuit element 6, when viewed from the direction in which the optical axis GA extends. In the present embodiment, the attachment positions 7c of the signal processing board 7 to the housing 1 are provided at four positions located between the pair of the imaging element substrates 5 and the circuit element 6, as illustrated in FIG. 3, but the number and positions of the attachment positions 7c are not particularly limited. Similarly, in the present embodiment, attachment positions 17a of the cover 17 to the housing 1 are provided at four positions in the four corners of the housing 1, as illustrated in FIG. 3, but the number and positions of the attachment positions 17a are not particularly limited. In the present embodiment, the attachment positions 7c of the signal processing board 7 to the housing 1 and the attachment positions 17a of the cover 17 to the housing 1 may be provided at wholly or partially the same positions.

Figure 7:
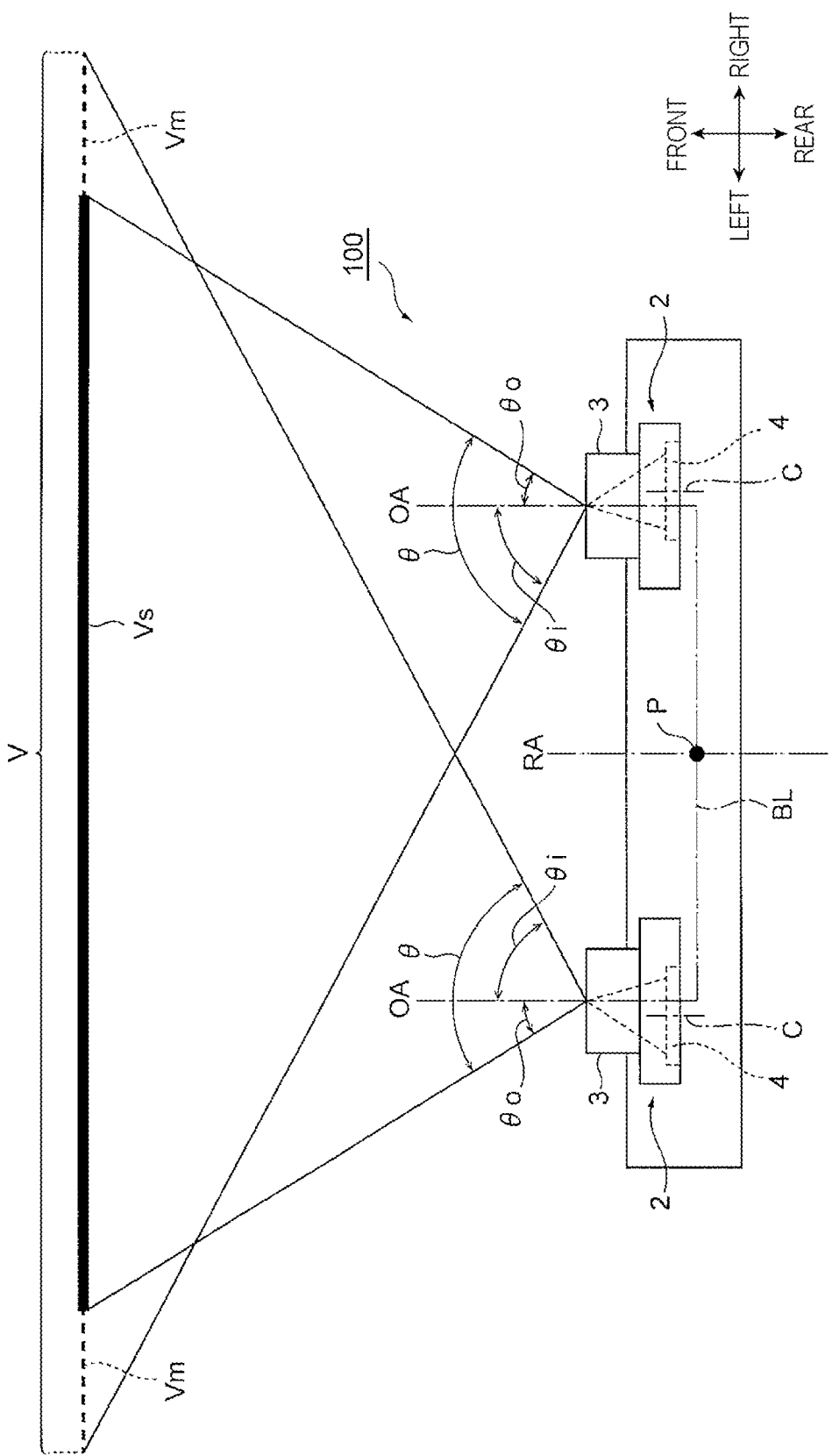
FIG. 7 is a schematic view for explaining a positional relationship between a pair of imaging elements and optical axes.
Figure 8:
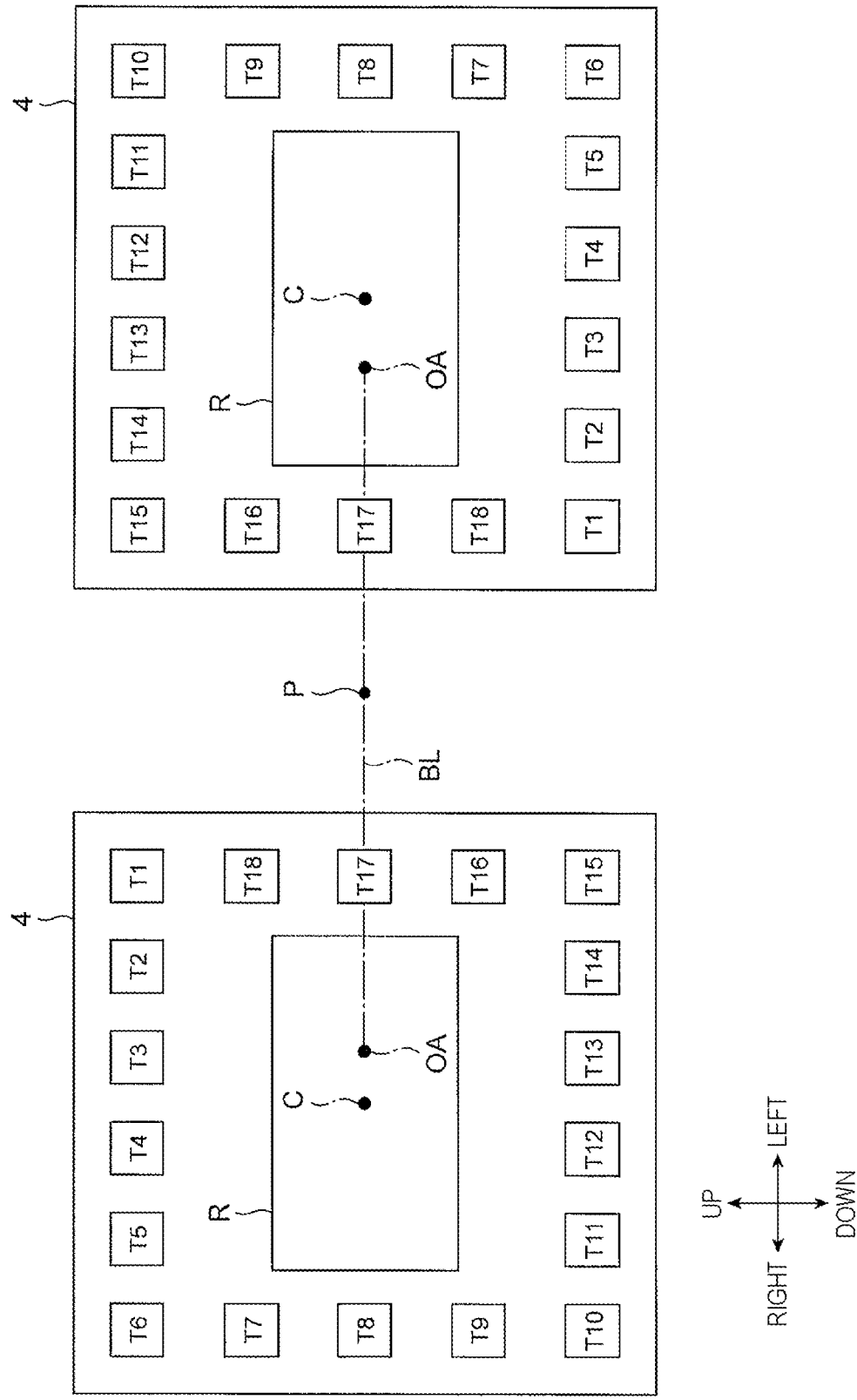
FIG. 8 is a schematic view for explaining arrangement of terminals in each of the pair of imaging elements.
Figure 9:
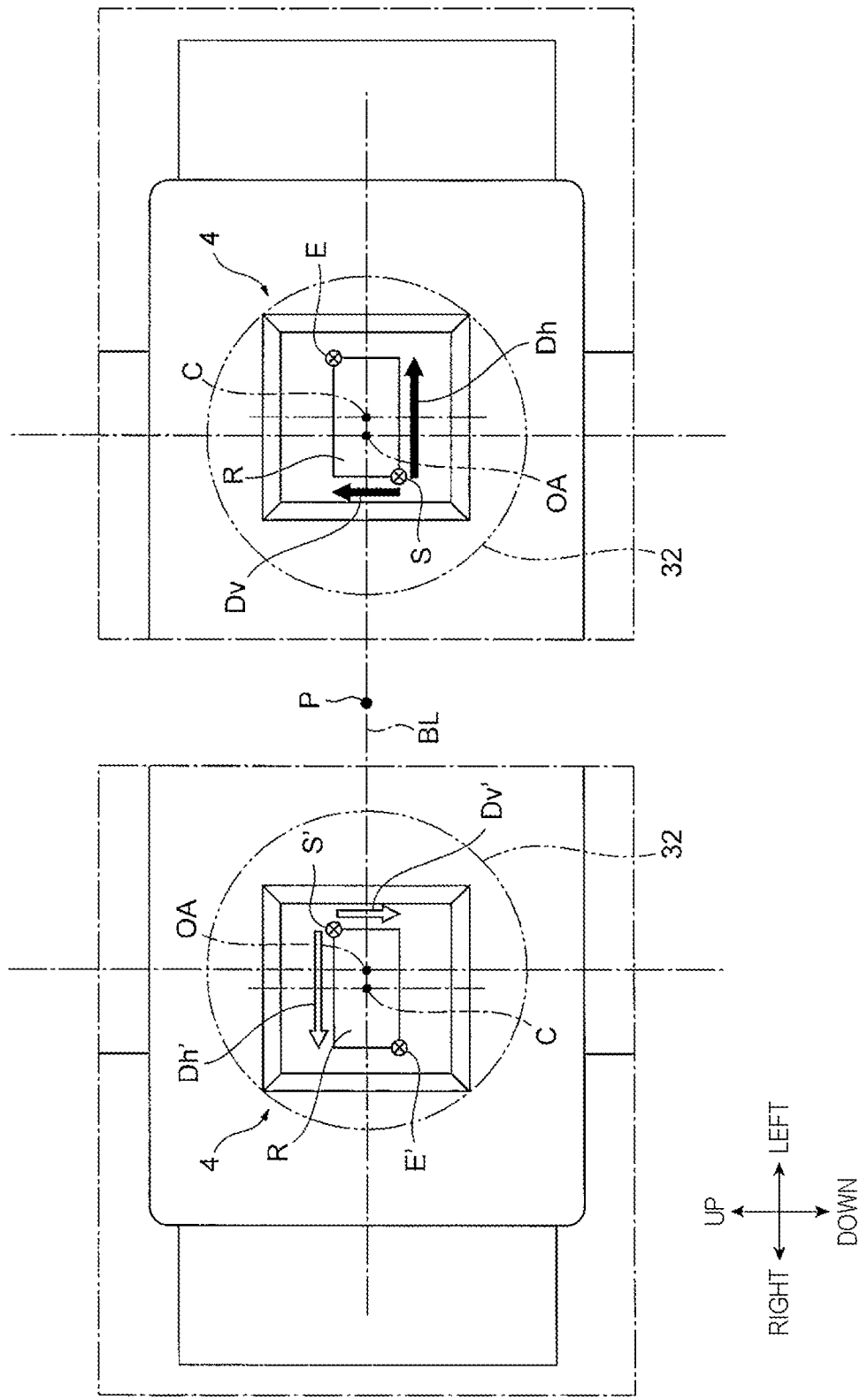
FIG. 9 is a schematic view for explaining a read start point, a read end point, and a read direction in an imaging device of a comparative example.
Figure 10:
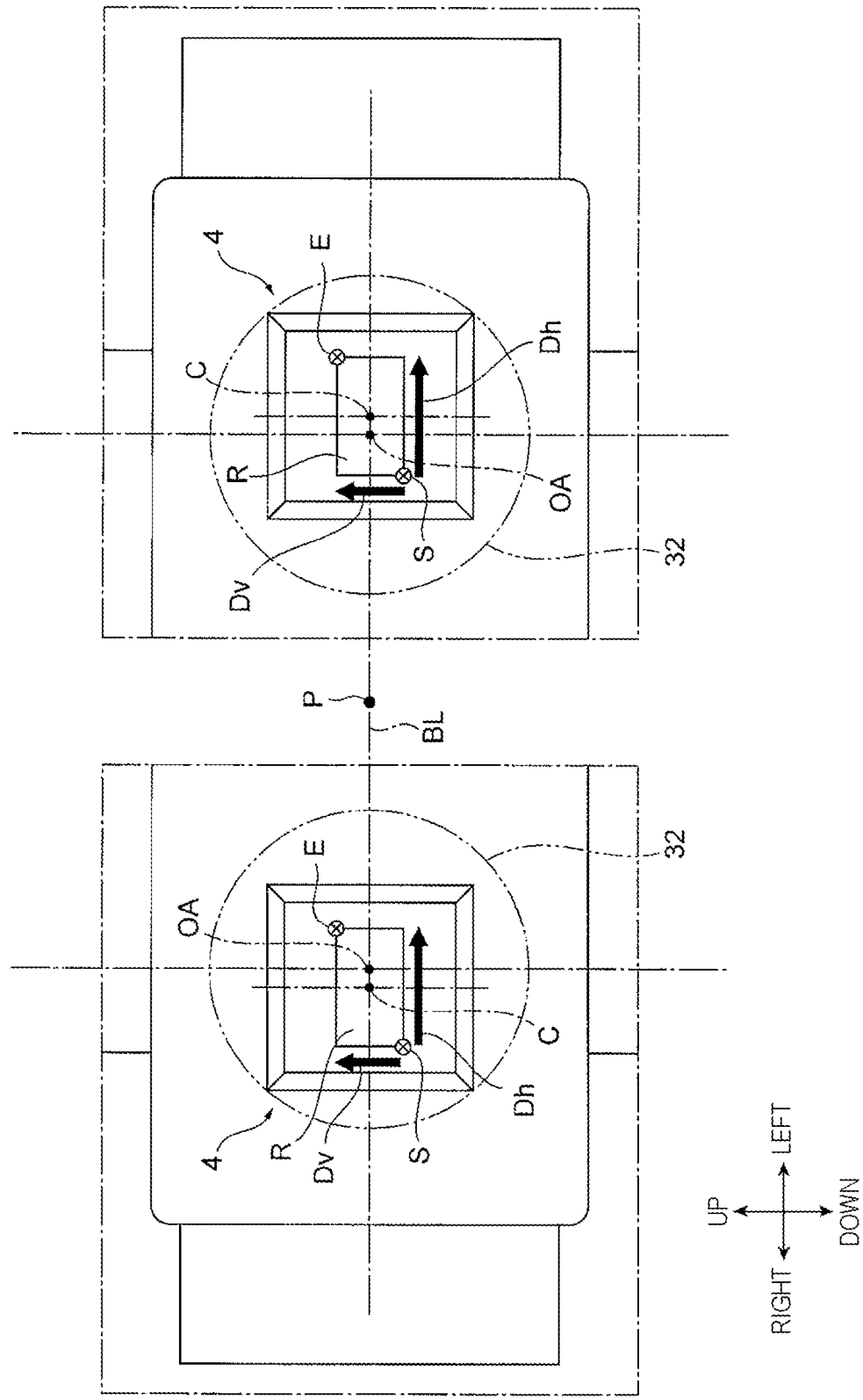
FIG. 10 is a schematic view for explaining a read start point, a read end point, and a read direction in an imaging device of the present embodiment.

FIG. 7 is a schematic view for explaining a positional relationship between the pair of the imaging elements 4 and the optical axes OA. FIG. 8 is a schematic view for explaining arrangement of terminals T1 to T18 in each of the pair of the imaging elements 4 provided point-symmetrically to each other. FIG. 9 is a schematic view for explaining a read start point, a read end point, and a read direction in an imaging device 100 of a comparative example. FIG. 9 corresponds to an enlarged view of a portion B illustrated in FIG. 6. FIG. 10 is a schematic view for explaining a read start point, a read end point, and a read direction in the imaging device 100 of the present embodiment. FIG. 10 corresponds to an enlarged view of the portion B illustrated in FIG. 6.

In the imaging device 100 according to the present embodiment, the pair of camera modules 2 have a configuration in which centers C of the pair of the imaging elements 4 are arranged at positions separated from the optical axes OA by the same distance in a direction in which the centers C are away from each other. In the pair of camera modules 2, the center C of each of the pair of the imaging elements 4 is arranged at a position separated, in the outward direction, from the optical axis OA by the same distance.

In other words, in each of the pair of the imaging elements 4, the center C of the imaging element 4 is arranged to deviate in the left-right direction, that is, along the base line BL with respect to the optical axis OA. On the other hand, the center C of each of the pair of the imaging elements 4 is not separated from the optical axis OA in the up-down direction, that is, in the direction orthogonal to the base line BL and the optical axis OA. In other words, the center C of each of the pair of the imaging elements 4 matches the optical axis OA in the up-down direction, that is, in the direction orthogonal to the base line BL and the optical axis OA. The distance by which the center C of the imaging element 4 is separated from the optical axis OA is the same distance between one and the other of the pair of the imaging elements 4.

FIG. 7 illustrates a case where the center C of each of the pair of the imaging elements 4 is separated, in the outward direction, from the optical axis OA. The light receiving surface of the imaging element 4 has a plurality of pixels arranged in a matrix. In the case of FIG. 7, a pixel region, outside the optical axis OA, of the imaging element 4 is larger than a pixel region, inside the optical axis OA, of the imaging element 4. Therefore, in the case of FIG. 7, an angle of view θ of each of the pair of camera modules 2 has an inner angle of view θi larger than an outer angle of view θo. The inner angle of view θi means a portion of the angle of view θ of the camera module 2 that is located inside the optical axis OA in the left-right direction. The outer angle of view θo means a portion of the angle of view θ of the camera module 2 that is located outside the optical axis OA in the left-right direction.

A field of view V of the imaging device 100 is a range in which an image can be captured by the pair of camera modules 2, and is a range in which a subject can be detected in a sensing system including the imaging device 100. The field of view V includes a stereo vision area Vs indicating a range in which an image can be captured by both one and the other of the pair of camera modules 2, and a monocular vision area Vm indicating a range in which an image can be captured by either one or the other of the pair of camera modules 2. In the case of FIG. 7, when the inner angle of view θi is larger than the outer angle of view θo, the stereo vision area Vs is expanded more than a conventional case where the center C of the imaging element 4 is arranged at a position that matches the optical axis OA. In addition, in the case of FIG. 7, the monocular vision area Vm appears on the left and right of the stereo vision area Vs.

That is, in the imaging device 100, the center C of each of the pair of the imaging elements 4 is arranged at a position separated, in the outward direction, from the optical axis OA, so that the stereo vision area Vs can be expanded, and the monocular vision area Vm can be allowed to appear on the left and right of the stereo vision area Vs. Therefore, the imaging device 100 according to the present embodiment can expand the field of view V, or a range in which a subject can be detected, more than the conventional case where the center C of the imaging element 4 is arranged at a position that matches the optical axis OA, thereby realizing widening an angle of view.

Here, if the center C of each of the pair of the imaging elements 4 is simply arranged at a position separated, in the outward direction, from the optical axis OA, it is necessary to use one and the other of the pair of the imaging element substrates 5 as dedicated components, or to use the flanges 33 and the like of one and the other of the pair of the lens units 3 as dedicated components. That is, if the center C of each of the pair of the imaging elements 4 is simply arranged at a position separated, in the outward direction, from the optical axis CA, it can be difficult to achieve commonality of components between the pair of camera modules 2. If the commonality of components cannot be achieved, there is a risk that the cost of equipment and management for manufacturing the imaging device 100 may increase, or components may be erroneously attached to one and the other of the pair of camera modules 2, thereby decreasing productivity.

Therefore, the imaging device 100 according to the present embodiment has the following configuration, instead of simply arranging the center C of each of the pair of the imaging elements 4 at a position separated, in the outward direction, from the optical axis OA. That is, in the imaging device 100 according to the present embodiment, each of the pair of camera modules 2 has a configuration in which the imaging element 4 and the lens unit 3 are relatively arranged such that the center C of the imaging element 4 is separated from the optical axis OA by the same distance in the same direction. Then, in the pair of camera modules 2 of the imaging device 100 according to the present embodiment, with respect to the posture of one camera module 2, the other camera module 2 is arranged in an inverted posture in which the other camera module 2 has rotated around the rotation axis RA. In other words, in the imaging device 100 according to the present embodiment, one and the other of the pair of camera modules 2 are provided point-symmetrically to each other with the midpoint P of the base line BL as a center of symmetry, when viewed from the direction of the optical axis OA.

As a result, in the imaging device 100 according to the present embodiment, the center C of each of the pair of the imaging elements 4 is arranged at a position separated, in the outward direction, from the optical axis CA, so that widening an angle of view more than before can be realized, as described above. In addition, in the imaging device 100 according to the present embodiment, commonality of components, such as the lens unit 3, can be achieved between the pair of camera modules 2, so that productivity can be improved.

When, with respect to the posture of one camera module 2, the other camera module 2 is arranged in an inverted posture, as described above, the terminals T1 to T18 of the one imaging element 4 and the terminals T1 to T18 of the other imaging element 4 have a point-symmetrical relationship, as illustrated, for example, in FIG. 8. The point-symmetrical relationship means a relationship in which when one camera module is rotated around the rotation axis RA by 180 degrees, the one camera module overlaps the other.

Here, if, with respect to the posture of one camera module 2, the other camera module 2 is simply arranged in an inverted posture, the read directions Dh, Dv, in which a signal is read from each of the plurality of pixels of the imaging element 4, are in a point-symmetrical relationship between the pair of the imaging elements 4. That is, by arranging, with respect to the posture of one camera module 2, the other camera module 2 in an inverted posture in the imaging device 100, the read directions Dh, Dv are relatively opposite directions between the pair of the imaging elements 4, when viewed from the outside.

The imaging element 4 has a pixel region R including a plurality of pixels arranged in a matrix. Each of the plurality of pixels constituting the pixel region R includes a circuit that performs photoelectric conversion, such as a photodiode, and converts incident light into an electric charge and accumulates the electric charge. The electric charge accumulated in each of the plurality of pixels constituting the pixel region R is read as a signal according to a preset pixel order by a read operation for a drive circuit of the imaging element 4. The image signal output from the imaging element 4 is generated on the basis of the signal read from each of the plurality of pixels.

In the present embodiment, a pixel, from which a signal is first read among the plurality of pixels constituting the pixel region R of the imaging element 4, is also referred to as a "read start point S". A pixel, from which a signal is finally read among the plurality of pixels constituting the pixel region R of the imaging element 4, is also referred to as a "read end point E". The order of pixels, in which signals are read from the plurality of pixels constituting the pixel region R of the imaging element 4, is also referred to as the "read directions Dh, Dv".

The positions of the read start point S and the read end point E are designated as relative positions in the pixel region R by addresses each assigned to each pixel in the pixel region R. The read directions Dh, Dv include a horizontal read direction Dh and a vertical read direction Dv. The horizontal read direction Dh indicates the order of pixels in which signals are read among the pixels arranged in the left-right direction. The vertical read direction Dv indicates the order of pixels in which signals are read among the pixels arranged in the up-down direction.

FIG. 9 illustrates an example in which the read start point S, the read end point E, the read directions Dh, Dv are in a point-symmetrical relationship between the pair of the imaging elements 4. In the example of FIG. 9, the read start point S, the read end point E, the read directions Dh, Dv are relatively different between the pair of the imaging elements 4, when viewed from the outside of the imaging device 100. Specifically, in the example of FIG. 9, signals are sequentially read from the read start point S along the horizontal read direction Dh in the left imaging element 4, while in the right imaging element 4, signals are sequentially read from a read start point S' along a horizontal read direction Dh'. In the example of FIG. 9, an image acquired by the left imaging element 4 is sequentially generated in order from the lower left pixel (read start point S) in FIG. 9 to the left, whereas an image acquired by the right imaging element 4 is sequentially generated in order from the upper right pixel (read start point S') in FIG. 9 to the right. In the example of FIG. 9, a pair of images cannot be acquired in synchronization with each other in real time, and there may be a problem that stereo matching processing for searching for corresponding points between a pair of images becomes complicated or cannot be stably performed.

Therefore, in the imaging device 100 according to the present embodiment, to the read directions Dh, Dv in which signals are read from the imaging element 4 and that have been set in advance in one camera module 2, the read directions Dh, Dv, in which signals are read from the imaging element 4 of the other camera module 2, are set to be opposite. As a result, in the imaging device 100 according to the present embodiment, even when, with respect to the posture of one camera module 2, the other camera module 2 is arranged in an inverted posture, the read directions Dh, Dv are relatively the same directions between the pair of the imaging elements 4, when viewed from the outside.

Specifically, in the imaging device 100, the address of the read start point S of one imaging element 4 is set to be relatively the same address as the address of the read end point E of the other imaging element 4. In addition, the address of the read end point E of one imaging element 4 is set to be relatively the same address as the address of the read start point S of the other imaging element 4. In addition, the horizontal read direction Dh of one imaging element 4 is set to be opposite to the horizontal read direction Dh of the other imaging element 4. The vertical read direction Dv of one imaging element 4 is set to be opposite to the vertical read direction Dv of the other imaging element 4.

In the example of FIG. 10, signals are sequentially read from the read start point S along the horizontal read direction Dh in the left imaging element 4, while in the right imaging element 4, signals are sequentially read from the read start point S along the horizontal read direction Dh. In the example of FIG. 10, the image acquired by the right imaging element 4 is sequentially generated from the lower left pixel in FIG. 10 to the left, similarly to the image acquired by the left imaging element 4.

As a result, in the imaging device 100 according to the present embodiment, the pair of images acquired by the pair of the imaging elements 4 are sequentially generated from the positions of the same pixels toward the same direction on the images, so that they are generated in synchronization with each other in real time. Therefore, in the imaging device 100 according to the present embodiment, a pair of images can be acquired in synchronization with each other in real time, and the problem that stereo matching processing becomes complicated or cannot be stably performed can be solved.

Note that the setting of the read start point S, the read end point E, and the read directions Dh, Dv may be performed in advance when the imaging device 100 is manufactured. The setting may be performed, for example, by writing in advance a setting value, indicating each of the read start point S, the read end point E, and the read directions Dh, Dv, in a register included in each of the pair of the imaging elements 4.

In the imaging device 100 according to the present embodiment, each of the pair of camera modules 2 has a configuration in which the imaging element 4 and the lens unit 3 are relatively arranged such that the center of the imaging element 4 is separated from the optical axis OA by the same distance in the same direction, as described above. In the pair of camera modules 2, with respect to the posture of one camera module 2, the other camera module 2 is arranged in an inverted posture in which the other camera module 2 has rotated around the rotation axis RA along the optical axis OA. And, between the pair of camera modules 2, to the read directions Dh, Dv in which signals are read and that have been set in advance in one camera module 2, the read directions Dh, Dv of the other camera module 2 are set to be opposite.

With the above configuration, the imaging device 100 according to the present embodiment can: achieve commonality of components while easily widening the angles of view of the pair of camera modules 2; acquire, by the pair of camera modules 2, a pair of images in synchronization with each other in real time; and solve the problem that stereo matching processing becomes complicated or cannot be stably performed. Therefore, the imaging device 100 according to the present embodiment can reliably achieve both widening an angle of view and an improvement in productivity.

Of course, in the pair of the imaging element substrates 5 included in the pair of camera modules 2, one imaging element substrate 5 and the other imaging element substrate 5 are made of the same material, and with respect to the posture of one imaging element substrate 5, the other imaging element substrate 5 is arranged in an inverted posture in which the other imaging element substrate 5 has rotated around the rotation axis RA. That is, the pair of the imaging element substrates 5 are provided point-symmetrically to each other with the midpoint P of the base line BL as a center of symmetry, when viewed from the direction of the optical axis OA, as illustrated in FIG. 5. Similarly, in the pair of the lens units 3 included in the pair of camera modules 2, one lens unit 3 and the other lens unit 3 are made of the same material, and with respect to the posture of one lens unit 3, the other lens unit 3 is arranged in an inverted posture in which the other lens unit 3 has rotated around the rotation axis RA. That is, the pair of the lens units 3 are provided point-symmetrically to each other with the midpoint P of the base line BL as a center of symmetry, when viewed from the direction of the optical axis CA, as illustrated in FIG. 5.

With the above configuration, the imaging device 100 according to the present embodiment can achieve commonality of all the main components in the pair of camera modules 2. Since the cost of equipment and management for manufacturing the imaging device 100 can be significantly suppressed, and the risk that components may be erroneously attached to one and the other of the pair of camera modules 2 can be significantly suppressed, productivity can be significantly improved. Therefore, the imaging device 100 according to the present embodiment can reliably achieve both widening an angle of view and an improvement in productivity while greatly improving productivity.

Furthermore, in the imaging device 100 according to the present embodiment, the pair of the imaging element substrates 5 include the pair of the first connectors 53 to be mounted on the back surfaces 5b of the respective second end portions 52, and the signal processing board 7 includes the pair of the second connectors 73 to be mounted on the back surfaces 7b of the respective both end portions 71, as illustrated in FIG. 4.

In the pair of the first connectors 53, one first connector 53 and the other first connector 53 are made of the same material, and with respect to the posture of one first connector 53, the other first connector 53 is arranged in an inverted posture in which the other first connector 53 has rotated around the rotation axis RA. That is, the pair of the first connectors 53 are provided point-symmetrically to each other with the midpoint P of the base line BL as a center of symmetry, when viewed from the direction of the optical axis OA, as illustrated in FIG. 3.

Similarly, in the pair of the second connectors 73, one second connector 73 and the other second connector 73 are made of the same material, and with respect to the posture of one second connector 73, the other second connector 73 is arranged in an inverted posture in which the other second connector 73 has rotated around the rotation axis RA. That is, the pair of the second connectors 73 are provided point-symmetrically to each other with the midpoint P of the base line BL as a center of symmetry, when viewed from the direction of the optical axis OA, as illustrated in FIG. 3.

With the above configuration, the pair of the first connectors 53 and the pair of the second connectors 73 are provided at the end portions in the left-right direction in the imaging device 100 according to the present embodiment, so that the length of the wiring member 54 can be relatively shortened. In addition, the imaging device 100 according to the present embodiment can achieve commonality of the pair of the first connectors 53 and the pair of the second connectors 73. Therefore, the imaging device 100 according to the present embodiment can reliably achieve both widening an angle of view and an improvement in productivity while further improving productivity.

Furthermore, in the imaging device 100 according to the present embodiment, one wiring member 54 and the other wiring member 54 of the pair of the wiring members 54 are made of the same material, and with respect to the posture of one wiring member 54, the other wiring member 54 is arranged in an inverted posture in which the other wiring member 54 has rotated around the rotation axis RA. That is, the pair of the wiring members 54 are provided point-symmetrically to each other with the midpoint P of the base line BL as a center of symmetry, when viewed from the direction of the optical axis OA, as illustrated in FIGS. 3 to 5.

With the above configuration, the imaging device 100 according to the present embodiment can achieve commonality of the pair of the wiring members 54. Therefore, the imaging device 100 according to the present embodiment can reliably achieve both widening an angle of view and an improvement in productivity while further improving productivity.

Figure 11:
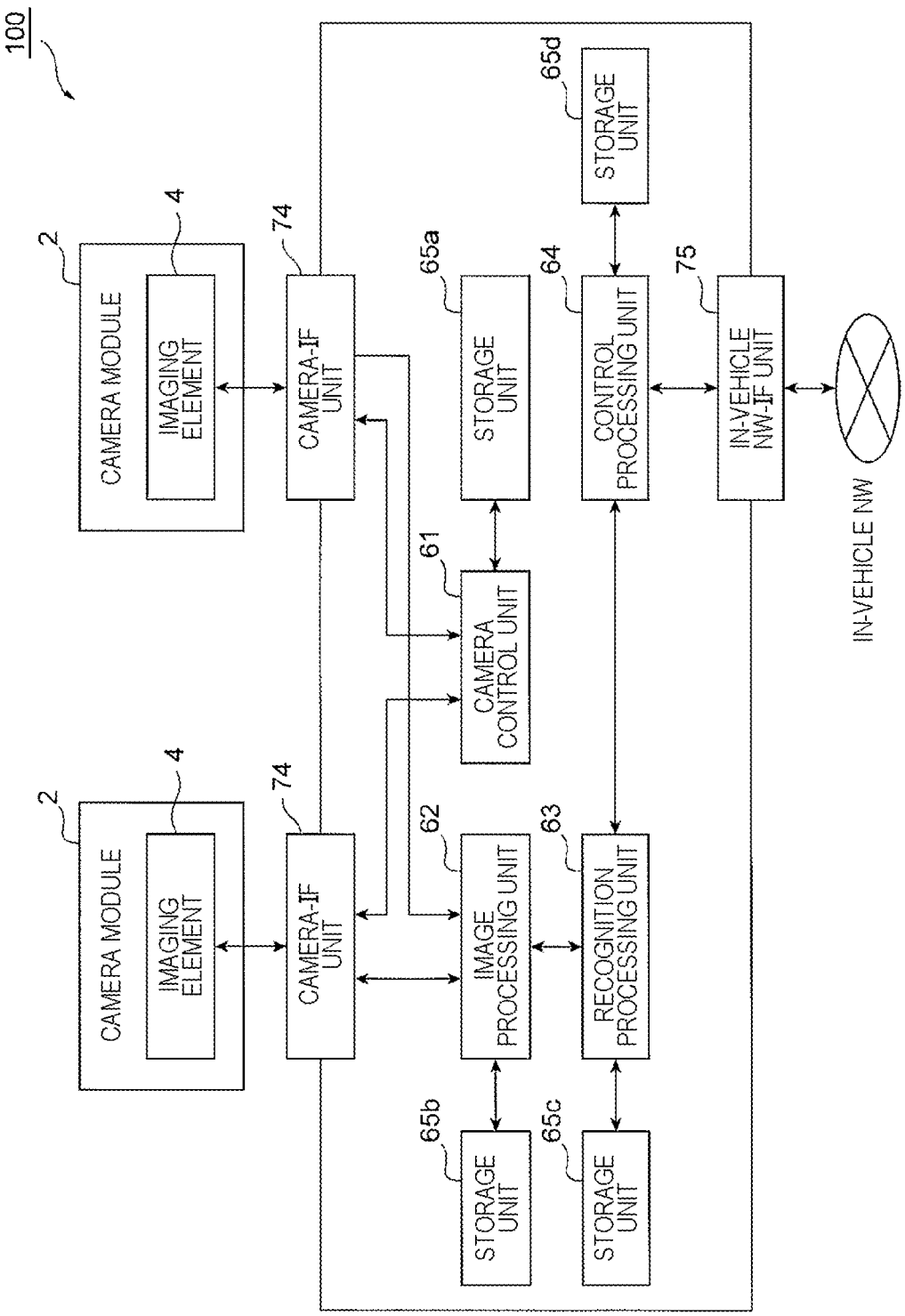
FIG. 11 is a block diagram illustrating a functional configuration of the imaging device.

FIG. 11 is a block diagram illustrating a functional configuration of the imaging device 100.

The imaging device 100 includes, in addition to the pair of camera modules 2 including the pair of the imaging elements 4, a camera control unit 61, an image processing unit 62, a recognition processing unit 63, a control processing unit 64, storage units 65a to 65d, a camera-IF unit 74, and an in-vehicle NW-IF unit 75.

The camera control unit 61 performs various settings of the pair of camera modules 2 and controls the operations of the pair of camera modules 2 via the camera-IF unit 74. The camera control unit 61 can set the read start point S, the read end point E, and the read directions Dh, Dv in the pair of the imaging elements 4. The setting value, indicating each of the read start point S, the read end point E, and the read directions Dh, Dv, may be stored in the storage unit 65a in advance.

The image processing unit 62 performs image processing on the pair of images acquired by the pair of camera modules 2. The image processing unit 62 performs stereo matching processing on the pair of images to search for corresponding points between the pair of images, and calculates a parallax.

The recognition processing unit 63 performs image recognition on the basis of a result of the image processing performed by the image processing unit 62. The recognition processing unit 63 detects a subject present around the vehicle, and measures a distance to the subject and a position thereof.

The control processing unit 64 outputs, on the basis of the measurement result by the recognition processing unit 63, information, necessary for vehicle driving control, warning notification, and the like, to the controller of the vehicle via the in-vehicle NW-IF unit 75.

The storage unit 65a stores programs and data for implementing the functions of the camera control unit 61. The storage unit 65b stores programs and data for implementing the functions of the image processing unit 62. The storage unit 65c stores programs and data for implementing the functions of the recognition processing unit 63. The storage unit 65d stores programs and data for implementing the functions of the control processing unit 64.

The camera control unit 61, the image processing unit 62, the recognition processing unit 63, the control processing unit 64, the storage units 65a to 65d, the camera-IF unit 74, and the in-vehicle NW-IF unit 75 are made of electronic components mounted on the signal processing board 7 including the circuit elements 6 described above.

With the above configuration, the imaging device 100 can capture an image of the surroundings of the vehicle by the pair of camera modules 2, process the acquired image to recognize an object present around the vehicle, and output information necessary for vehicle driving control, warning notification, and the like.

In the above embodiment, a case has been described as an example, where the signal processing board 7 is arranged with a space, in the rear direction, from each of the pair of the imaging element substrates 5 so as to face the back surfaces 5b of the imaging element substrates 5. However, the signal processing board 7 may be arranged between the pair of imaging element substrates 5 in the left-right direction.

In the sensing system configured by the imaging device 100 according to the above embodiment, a method of shifting the range, where an image is captured by the pair of camera modules 2, in the left-right direction is adopted, so that the detection range can be expanded more than before. As a result, the sensing system achieves widening an angle of view without significantly increasing the number of pixels, and can operate a collision damage mitigation brake when turning right or left at an intersection, while maintaining long-distance detection capability necessary for an adaptive cruise control (ACC) function. Note that in the above embodiment, the case where the imaging device 100 is a stereo camera has been described as an example, but the present invention can also be applied to an imaging device having three or more camera modules 2. Even in this case, both widening an angle of view and an improvement in productivity can be reliably achieved by achieving commonality of the components of the pair of camera modules 2 arranged spaced apart from each other in the left-right direction.

[Others] Note that the present invention is not limited to the above embodiment, and includes various modifications. For example, the above embodiment has been described in detail for easily explaining the present invention, and the present invention is not necessarily limited to embodiments including all the configurations described above. In addition, a part of the configuration of one embodiment can be replaced with the configuration of another embodiment, or the configuration of another embodiment can also be added to the configuration of one embodiment. In addition, a part of the configuration of each embodiment can be added or replaced with another configuration, or deleted.

In addition, some or all of the above configurations, functions, processing units, processing means, and the like may be realized by hardware by designing with, for example, integrated circuits. In addition, each of the above configurations, functions, and the like may be realized by software by a processor interpreting and executing programs for realizing each function. Information on a program, a tape, a file, etc., for realizing each function can be stored in a recording device such as a memory, a hard disk, or a solid state drive (SSD), or a recording medium such as an IC card, an SD card, or a DVD.

In addition, the control lines and the information lines that are considered to be necessary for explanation are described, but all of the control lines and the information lines that are necessary for a product are not necessarily described. In fact, it may be considered that almost all the configurations are connected to each other.

REFERENCE SIGNS LIST 3 lens unit
4 imaging element
5 imaging element substrate
53 first connector
54 wiring member
6 circuit element
7 signal processing board
73 second connector
100 imaging device
BL baseline
Dv vertical read direction
Dh horizontal read direction E read end point
OA optical axis
P midpoint
RA rotation axis

The invention claimed is:

1. An imaging device comprising a pair of camera modules each including an imaging element and a lens unit, optical axes of the lens units of the pair of camera modules being arranged in parallel to each other, wherein:
   the pair of camera modules are arranged to be spaced apart from each other along a base line orthogonal to each of the optical axes and include a pair of imaging element substrates each mounting the imaging element;
   each of the pair of camera modules has a configuration in which the imaging element and the lens unit are relatively arranged such that a center of the imaging element is separated from the optical axis by the same distance in the same direction, a direction in which the center of the imaging element is separated from the optical axis is an outward direction from a midpoint of the base line toward the optical axis along the base line;
   one and the other of the pair of imaging element substrates are made of the same material;
   with respect to a posture of one of the camera modules, the other of the camera modules is arranged in an inverted posture in which the other of the camera modules has rotated around a rotation axis along the optical axis
   with respect to a posture of one of the imaging element substrates, the other of the imaging element substrates is arranged in an inverted posture in which the other of the imaging element substrates has rotated around the rotation axis;
   to a read direction in which a signal is read from the imaging element and that has been set in advance in the one of the camera modules, a read direction, in which a signal is read from the imaging element of the other of the camera modules, is set to be opposite.

2. The imaging device according to claim 1, further comprising a signal processing board arranged to face a back surface of the imaging element substrate that is opposite to a front surface of the imaging element substrate on which the imaging element is mounted, wherein:
   the imaging element substrate has a first end portion positioned in the outward direction and a second end portion positioned, in the outward direction, outside the first end portion;
   the pair of imaging element substrates include a pair of first connectors each mounted on the back surface of each of the second end portions;
   the signal processing board includes a pair of second connectors respectively mounted on both end portions positioned in the outward direction;
   one and the other of the pair of first connectors are made of the same material;
   with respect to a posture of one of the first connectors, the other of the first connectors is arranged in an inverted posture in which the other of the first connectors has rotated around the rotation axis;
   one and the other of the pair of second connectors are made of the same material; and
   with respect to a posture of one of the second connectors, the other of the second connectors is arranged in an inverted posture in which the other of the second connectors has rotated around the rotation axis.

3. The imaging device according to claim 2, further comprising a pair of wiring members respectively connecting the pair of first connectors and the pair of second connectors, wherein
   one and the other of the pair of wiring members are made of the same material, and
   with respect to a posture of one of the wiring members, the other of the wiring members is arranged in an inverted posture in which the other of the wiring members has rotated around the rotation axis.

* * * * *